United States Patent
Hashimoto et al.

(10) Patent No.: US 7,573,590 B2
(45) Date of Patent: Aug. 11, 2009

(54) PRINT SYSTEM CAPABLE OF REPRINT PRINT DATA STORED IN MEMORY OF PRINT CONTROL DEVICE

(75) Inventors: Naoki Hashimoto, Nagoya (JP); Toru Tsuzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 378 days.

(21) Appl. No.: 11/267,281

(22) Filed: Nov. 7, 2005

(65) Prior Publication Data

US 2006/0050313 A1  Mar. 9, 2006

Related U.S. Application Data

(62) Division of application No. 09/650,679, filed on Aug. 30, 2000, now Pat. No. 6,975,421.

(30) Foreign Application Priority Data

Aug. 31, 1999 (JP) .................................. 11-245908
Sep. 17, 1999 (JP) .................................. 11-263518

(51) Int. Cl.
  *G06F 3/12* (2006.01)
  *H04N 1/21* (2006.01)
(52) U.S. Cl. .................................. 358/1.13; 358/1.16
(58) Field of Classification Search ............... 358/1.16, 358/1.17, 1.14, 1.13, 1.15, 404, 444, 524, 358/527, 401, 501
See application file for complete search history.

(56) References Cited

U.S. PATENT DOCUMENTS

| | | | | |
|---|---|---|---|---|
| 5,220,438 A | * | 6/1993 | Yamamoto | 358/404 |
| 5,481,367 A | | 1/1996 | Yokoe et al. | 358/1.13 |
| 5,791,790 A | * | 8/1998 | Bender et al. | 358/1.16 |
| 5,828,466 A | * | 10/1998 | Imai et al. | 358/404 |
| 5,864,652 A | | 1/1999 | Murahashi | 358/1.16 |
| 5,911,037 A | * | 6/1999 | Yoshida | 358/1.16 |
| 5,923,013 A | | 7/1999 | Suzuki et al. | |
| 6,195,170 B1 | * | 2/2001 | Mizutani et al. | 358/1.14 |
| 6,201,610 B1 | * | 3/2001 | Ogino | 358/1.15 |
| 6,498,658 B1 | | 12/2002 | Sekikawa | |
| 6,535,298 B2 | | 3/2003 | Winter et al. | 358/1.16 |

(Continued)

FOREIGN PATENT DOCUMENTS

EP  0 738 949 A1  10/1996

(Continued)

*Primary Examiner*—Scott A Rogers
(74) *Attorney, Agent, or Firm*—Oliff & Berridge, PLC

(57) ABSTRACT

When a network printer receives print data appended with related data from a client device via a network (S11), the related data is separated from the print data (S12) and stored in a predetermined region of a hard disk (S13). The print data is stored in the hard disk (S14) in correspondence with the related data. Then, printing is executed to print out the print data (S15). When a user requests display of the related data (S16:YES), the related data is displayed on a display (S17). The related data includes related image data and management data. When a user requests printing of the related data (S18: YES), a printer engine prints out the related data (S19). In this way, the user can select desired print data in a short period of time.

18 Claims, 12 Drawing Sheets

U.S. PATENT DOCUMENTS

2004/0190057 A1 * 9/2004 Takahashi et al. .......... 358/1.15

FOREIGN PATENT DOCUMENTS

| EP | 1199677 A2 * | 4/2002 |
| JP | A4506144 T | 10/1992 |
| JP | A 07-061061 | 3/1995 |
| JP | A 08-286857 | 1/1996 |
| JP | 08030413 A * | 2/1996 |
| JP | A8095163 | 4/1996 |
| JP | A8314954 | 11/1996 |
| JP | A 10-027076 | 1/1998 |
| JP | A10066015 | 3/1998 |
| JP | A 11-136477 | 5/1999 |
| JP | A 11-143661 | 5/1999 |
| JP | A 11-175280 | 7/1999 |

* cited by examiner

PRINT SYSTEM CAPABLE OF REPRINT PRINT DATA STORED IN MEMORY OF PRINT CONTROL DEVICE

PRIORITY

This is a Division of application Ser. No. 09/650,679 filed Aug. 30, 2000. The entire disclosure of the prior application is hereby incorporated by reference herein in its entirety.

BACKGROUND

The present invention relates to a print system including client devices connected to a print control device, that controls print processes based on print data, and also relates to a memory medium storing a print control program for controlling the print processes.

Widely used conventional print systems include a plurality of client devices connected by a network to a network printer. The client devices prepare and transmit a plurality of sets of print data (hereinafter referred to as "print data sets" or "print jobs") to the printer, and the print data sets are stored by print job in a memory of the printer. The printer then prints out the print data sets by print job.

Because print data is stored in the memory of the printer, the user can reprint the print data without having to resend the print data from the client device to the printer. Because the memory of the printer can store a plurality of print data sets, the user needs to select a desired one of the plurality of print data sets stored in the memory of the printer. In order to enable the user to easily select a desired print data set, conventional print systems include a searching function for efficiently searching a print data set from all print data sets stored in the memory of the printer. In one example, a conventional printer reduces each print data set by a predetermined reduction rate and prepares a reduced print data set accordingly. The printer displays or prints out the reduced print data sets, so the user can select a desired print data set after visually confirming the contents of the print data sets.

However, the printer requires a certain amount of time to prepare such reduced print data. The burden placed on the printer is especially great, when the printer receives a large number of print data sets from client devices in a large print system. As a result, the reduced print data can take an extremely long time to prepare before the user can actually visually confirm the contents of the print data sets.

Although the amount of data can be reduced by increasing the reduction rate, the quality of the resultant display or printout will be poor, so the user will have difficulty in visually confirming the content of the print data sets.

There has been also known a conventional network printer including a reprint switch. When the reprint switch is pressed by a user, then the printer reprints out the last page of the print data set that was most recently stored in the memory of the printer.

Although these conventional printers can reprint all pages of a selected print data set or the last page of the last stored print data set, they cannot reprint the particular page of a particular print data set, such as only table contents of a selected print data set. Accordingly, when a user desires to reprint only such a particular page of a print job, the user must either operate the printer to reprint all pages of the print job or resend only data for the particular page to the printer.

SUMMARY OF THE INVENTION

It is an objective of the present invention to solve the above-described problems and also to provide a print system capable of displaying images relating to print job in a short period of time to enable a user to easily select a desired print job from a plurality of print jobs stored in a memory of a printer.

It is another objective of the present invention to provide a printer capable of reprinting only desired pages of a print job stored in the memory of a printer.

It is also objective of the present invention to provide a storing medium storing programs of and a method of controlling a print system to display images relating to print jobs in a short period of time to enable a user to easily select a desired print job from a plurality of print jobs stored in the memory of a printer.

It is also objective of the present invention to provide a storage medium storing programs of and a method of controlling a printer to reprint only desired pages of a print job stored in the memory of a printer.

In order to achieve the above and other objectives, there is provided a print system including a client device and a print control device. The printer deals with print data. The client device includes related data setting unit that sets related image data for the print data, and a transmission unit that transmits the print data and the related image data. The print control device is connected to the client device, and includes a receiving unit that receives the print data and the related image data from the client device, and a memory that stores the print data and the related image data in correspondence with the print data. At least one of the client device and the print control device includes an output unit that outputs the related image data when requested by a user.

There is also provided a print device connected to a computer. The print device includes a memory that stores print data for a plurality of pages, an input unit through which a user select at least one of the plurality of pages, and a printer engine that prints out only the at least one of the plurality of pages selected by the user.

Further, there is provide a method of controlling a print system including a client device dealing with print data and a print control device connected to the client device. The method includes the steps of a) setting related data for the print data, b) transmitting the related data and the print data from the client device to the print control device, c) storing the related data and the print data in correspondence with each other into a memory of the print control device, d) outputting the related data stored in the memory when requested by a user.

There is also provided a medium storing programs used in a print system including a client device and a print control device connected to the client device. The programs includes the programs of a) setting related data to the print data, b) transmitting the related data and the print data from the client device to the print control device, c) storing the related data and the print data in correspondence with each other into a memory of the print control device, and d) outputting the related data stored in the memory when requested by a user.

DETAILED DESCRIPTION OF THE PREFERRED EMBODIMENTS

Next, preferred embodiments of the present invention will be described while referring to the accompanying drawings.

Figure 1:
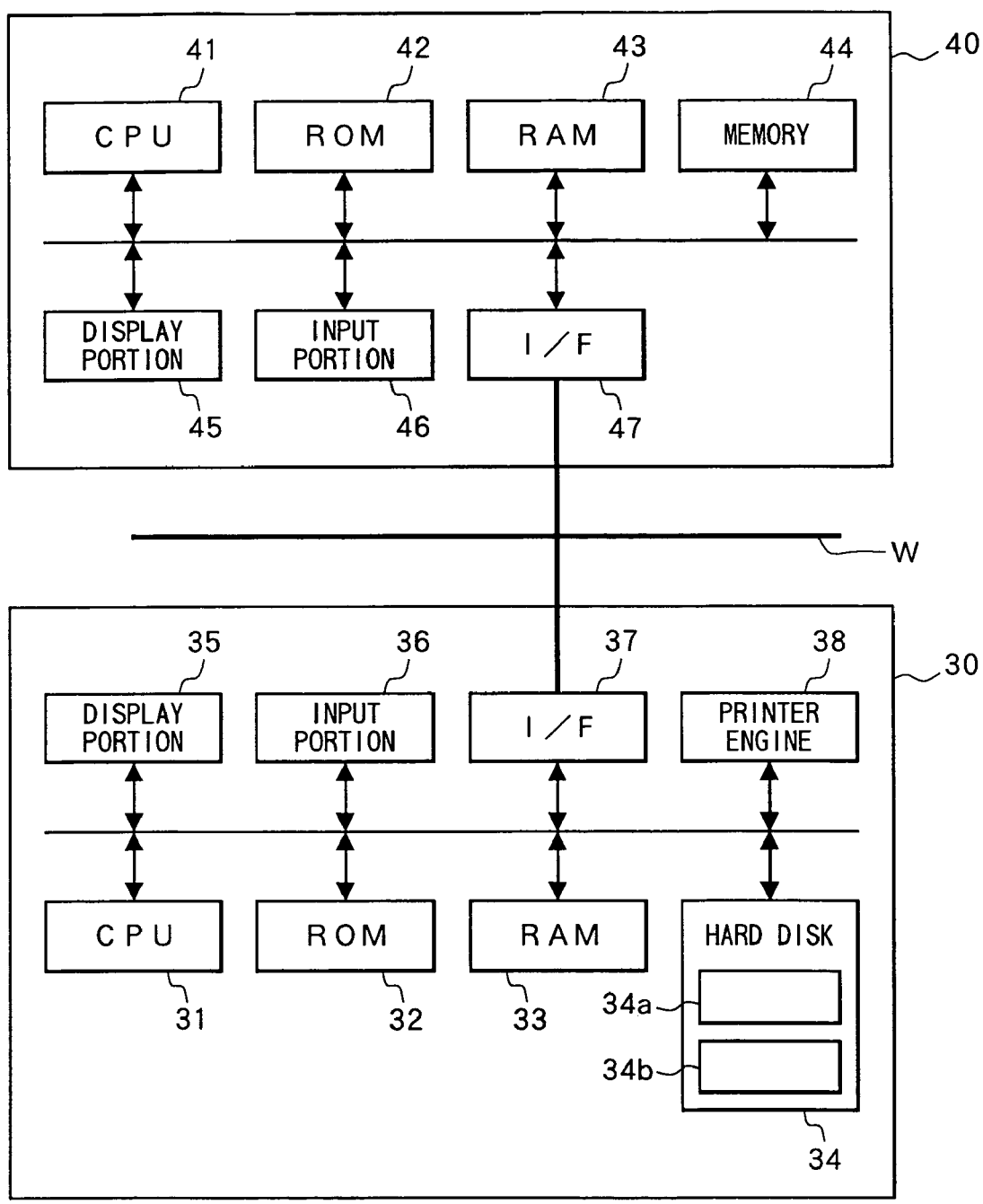
FIG. 1 is a block diagram showing a print system according to a first embodiment of the present invention.

First, a print system according to a first embodiment of the present invention will be described while referring to FIGS. 1 to 6. As shown in FIG. 1, the print system includes a network printer 30 and a client device 40 connected via a network W. It should be noted that a plurality of client devices 40 can be connected to the network W. However, in order to facilitate explanation, only a single client device 40 is shown in FIG. 1.

As shown in FIG. 1, the network printer 30 includes a central processing unit (CPU) 31, a read only memory (ROM) 32, a random access memory (RAM) 33, a hard disk 34, a display portion 35, an input portion 36, an interface 37, and a printer engine 38. The interface 37 of the network printer 30 is connected to the network W.

The CPU 31 performs overall control of the network printer 30 and also executes various control programs. The ROM 32 stores a print control program and various parameters as fixed data. The RAM 33 temporarily stores programs and data required for various processes. The RAM 33 also temporarily stores print data and related data transmitted from the client device 40. Details for the related data will be described later.

The hard disk 34 is a memory mainly for storing print data and related data transmitted from the client device 40. The hard disk 34 includes a print data storage region 34a and a related data storage region 34b. The print data storage region 34a stores a plurality of print data sets in order for each print job. The related data storage region 34b stores a plurality of related data sets in correspondence with the print data sets.

A conversion process, such as bitmap development process, is performed for print data before the print data is stored in the print data storage region 34a. The conversion process is for converting the print data into a format that the printer engine 38 uses when printing. Alternatively, the print data can be stored in the print data storage region 34a without its format being converted. In this case, the conversion process is performed when print processes are performed for the print data.

The display portion 35 displays data associated with the print processes, related data, and the like. The display portion 35 could be a liquid crystal display. The input portion 36 is for inputting data and commands to the network printer 30. The input portion 36 can include a key operation panel that the user operates to perform various operations.

The interface 37 transmits data to the client device 40 and receives data from the client device 40 across the network W.

The printer engine 38 prints out print data or related data for which a print command has been received from the CPU 31. The printer engine 38 could be an ink jet type or laser beam type printer engine, for example.

As shown in FIG. 1, the client device 40 includes a CPU 41, a ROM 42, a RAM 43, a memory 44, a display portion 45, an input portion 46, and an interface 47. The interface 47 is connected to the network W.

The CPU 41 performs overall control of the client device 40 and also executes a variety of different application software. The CPU 41 prepares a variety of different print data and related data by executing the application software.

The ROM 42 stores a variety of programs and parameters as fixed data. The RAM 43 temporarily stores, for example, work data for a variety of programs. The memory 44 is a rewritable memory, such as hard disk. A variety of application software are installed in the memory 44.

The display portion 45 displays data, such as image data and related data. The display portion 45 can be a cathode ray tube (CRT) or a liquid crystal display (LCD) for example. The input portion 26 is for inputting data required for processes in the client device 40. The input portion 26 can be a key board, for example.

The interface 47 transmits data to the printer 30 and receives data from the printer 30 across the network W.

Figure 3:
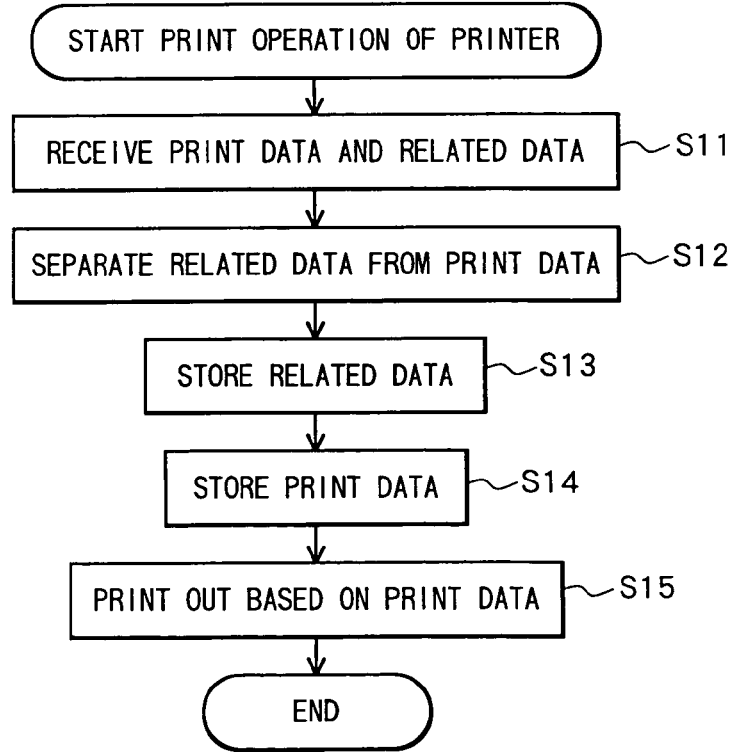
FIG. 3 is a flowchart representing print processes executed in a printer of the print system of FIG. 1.
Figure 4:
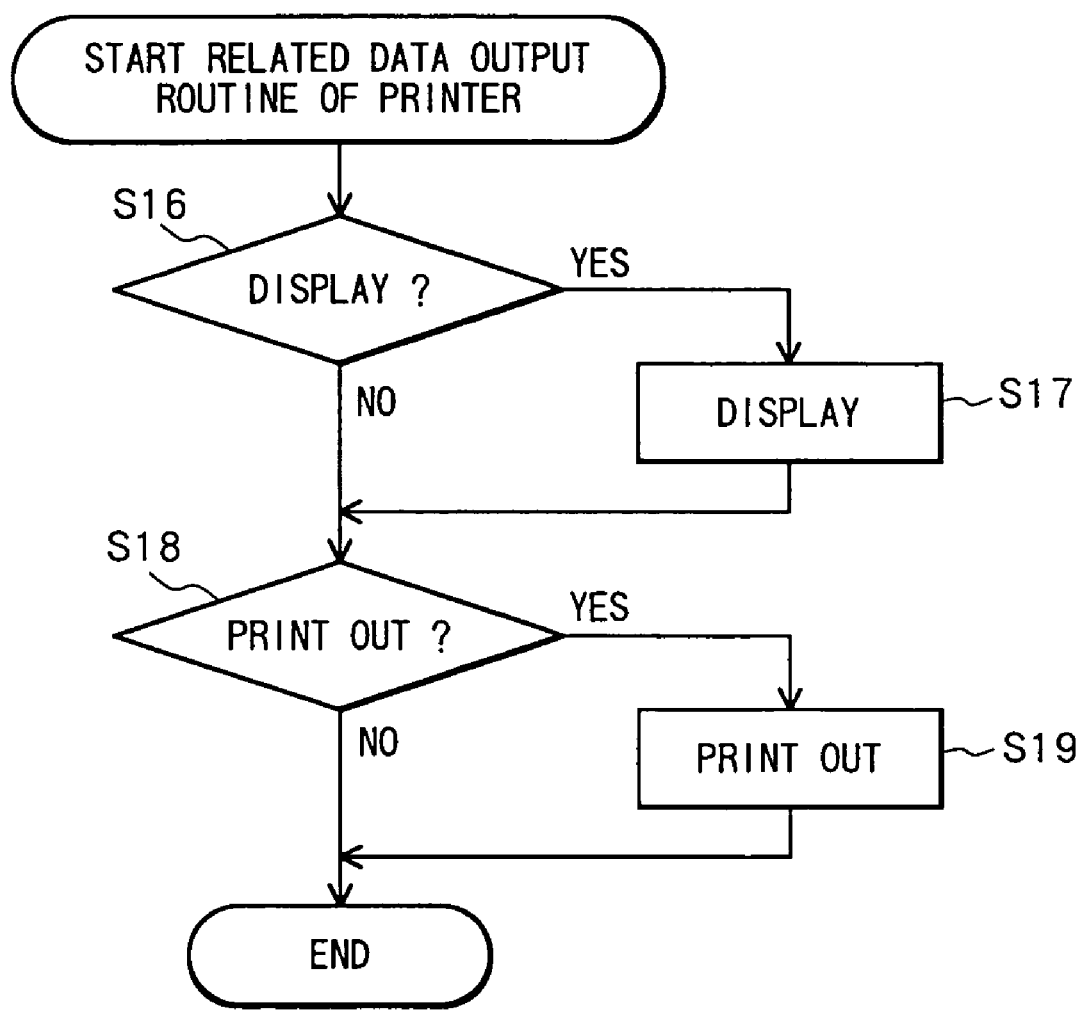
FIG. 4 is a flowchart representing related data output processes executed in the printer.

Next, processes performed by the print system according to the present embodiment will be described while referring to FIGS. 2 to 4.

Figure 2:
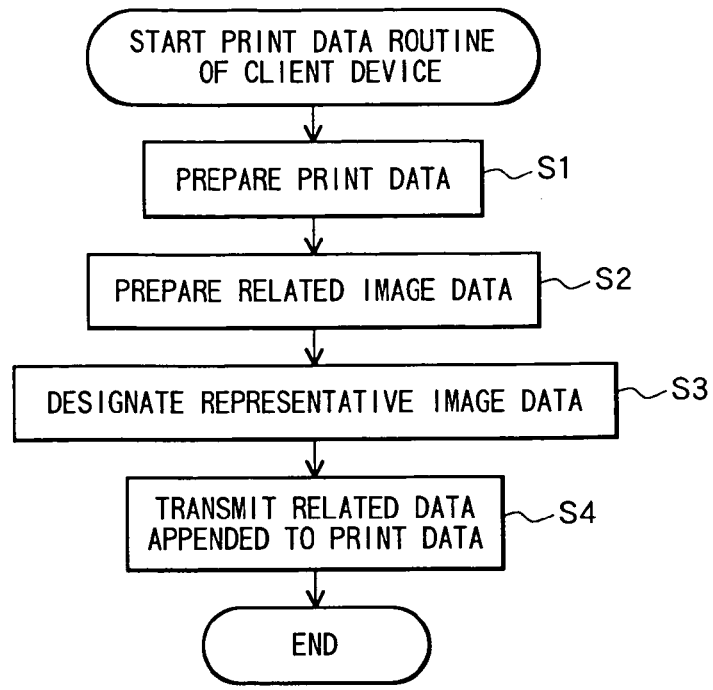
FIG. 2 is a flowchart representing processes executed in a computer of the print system of FIG. 1.

FIG. 2 is a flowchart representing the processes performed by the client device 40. First in S1, print data is prepared by using a predetermined application software in the client device 40. It should be noted that print data which has already been prepared can be used in S1 and the following processes.

Next, in S2 and S3, related data relating to the print data is prepared. The related data includes one or more related image data sets, which indicate related images, and a variety of different types of management data.

Specifically, in S2, related image data is prepared for each page of the print data by using either an appropriate application software or an additional function of the application software used in S1. That is, when the print data includes a plurality of different pages, then a plurality of related image data sets are prepared. When the print data includes only a single page, then only a single related image data set is prepared.

It should be noted that even if the print data includes a plurality of pages, only a single related image can be designated for the print data. Also, instead of preparing new images, one or a plurality of related images can be selected in S2 from various images prestored in the client device 40.

The related image data can be reduced data of print data; predetermined characters, figures, or symbols that represents the print data; user name of the client device 40; or any combination of these. That is to say, any data that enables the user to grasp the correspondence between the related image data and the corresponding print data can be used as the related image data.

Next, in S3, one of the related images for the print data is selected and designated as a representative image. When only one related image is prepared for the print data in S2, then the related image is automatically designated as the representative image.

Also in S2, management data is prepared for the print data. The management data indicates various management information, such as total page number, data ID, user's name, and other information. However, other different information can be displayed as well.

Next, in S4, the print data prepared in S1 and the related data prepared in S2 and S3 are transmitted across the network W to the network printer 30. At this time, the related data is appended to the print data as its header information. If the user wishes to immediately print out the print data, a print command to request print operations is also transmitted along with the print data. On the other hand, if not, the print command will not be transmitted at this time. Then, the present routine is ended.

Next, print processes performed in the network printer 30 will be described while referring to the flowchart in FIG. 3. First in S11, the network printer 30 receives the print data appended with the header information transmitted from the client device 40.

Next in S12, the related data, that is header information, is separated from the print data.

Then in S13, the CPU 31 stores the related data into the related data storage region 34b of the hard disk 34. At this time, the correspondence relationship is established between the related data and the print data, and also the representative image is clarified.

Next in S14, the print data is stored in the print data storage region 34a of the hard disk 34. Then, in S15, print operations are performed on the print data if the print command is received along with the print data. Print operations will not be performed unless a print command is received. Then, the routine is ended.

Next, relating data output processes performed in the printer 30 will be described while referring to the flowchart in FIG. 4. The process in FIG. 4 is automatically repeatedly executed at a predetermined timing as long as related data is stored in the related data storage region 34a.

First, the CPU 31 judges whether or not a related data display command has been received. The related data display command is for requesting the printer 30 to display the related data stored in the hard disk 34. The related data display command can be inputted by a user through either the input portion 36 of the printer 30 or the input portion 46 of the client device 40. If the related data display command is inputted through the input portion 46 of the client device 40, then the related data display command is transmitted from the client device 40 to the printer 30.

If a related data display command has been received (S16: YES), then in S17, the related data stored in the related data storage region 34b is displayed on the display portion 35. Then, the process proceeds to S18. On the other hand, if not (S16:NO), then the process proceeds directly to S18. It should be noted that the display in S17 can be performed using the display portion 45 of the client device 40. In this case, the related data is transmitted from the network printer 30 to the client device 40.

In S18, the CPU 31 judges whether or not a related data print command has been received. The related data print command is for requesting the printer 30 to print out the related data. The related data print command is inputted by the user through either the input portion 36 or the input portion 46. When the related data print command is inputted through the input portion 46 of the client device 40, the command is transmitted from the client device 40 to the network printer 30.

If the related data print command has been received (S18: YES), then in S19, the related data is printed on a sheet using the printer engine 38, and the present routine is ended. On the other hand, if not (S18:NO), S19 is skipped and the present routine is ended.

Figure 5:
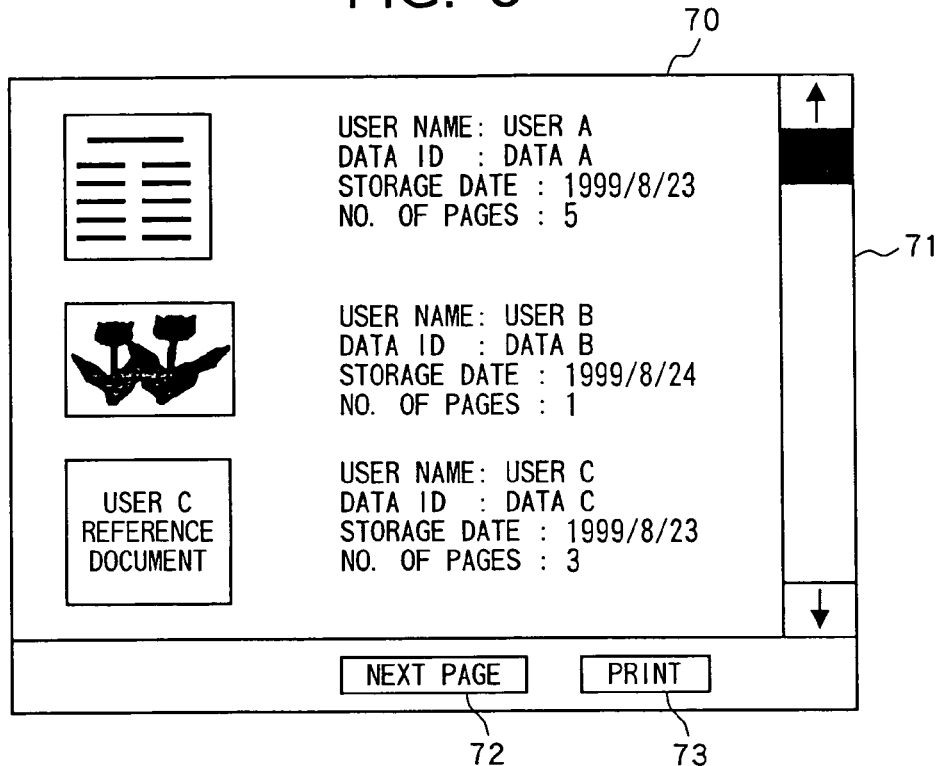
FIG. 5 is a view showing a screen displayed on a display portion of either the printer or the computer of the print system of FIG. 1.

Next, examples of related data screens displayed in S17 will be described while referring to FIGS. 5 and 6. In the example of FIG. 5, a screen 70 displays all representative images stored in the related data storage region 34a, each designated for a corresponding print data set stored in the print data storage region 34a. The screen 70 also displays corresponding management information next to the representative images. In this example, the management information includes a user name, a data ID, a storage date, and a total page number.

A scroll bar 71 is disposed at the right edge of the screen 70. The amount of information that can be displayed on the screen 70 is restricted by the size of the screen 70. In the example of FIG. 5, the screen 70 displays representative images and manage information for only three print data sets at the same time. However, by scrolling the screen 70 using the scroll bar 71, representative images and management information for the rest of the print data sets can be displayed as well.

A page changing button 72 and a print button 73 are disposed at a lower edge of the screen 70. Each time the page changing button 72 is pressed by the user, the screen 70 displays different ones of the related images of currently selected print data set. A print data set can be selected by the user clicking on its representative image using a mouse, for example. When the user presses the print button 73, the printer engine 38 prints out the representative images and management information of either all or selected ones of the print data sets stored in the hard disk 34.

Figure 6:
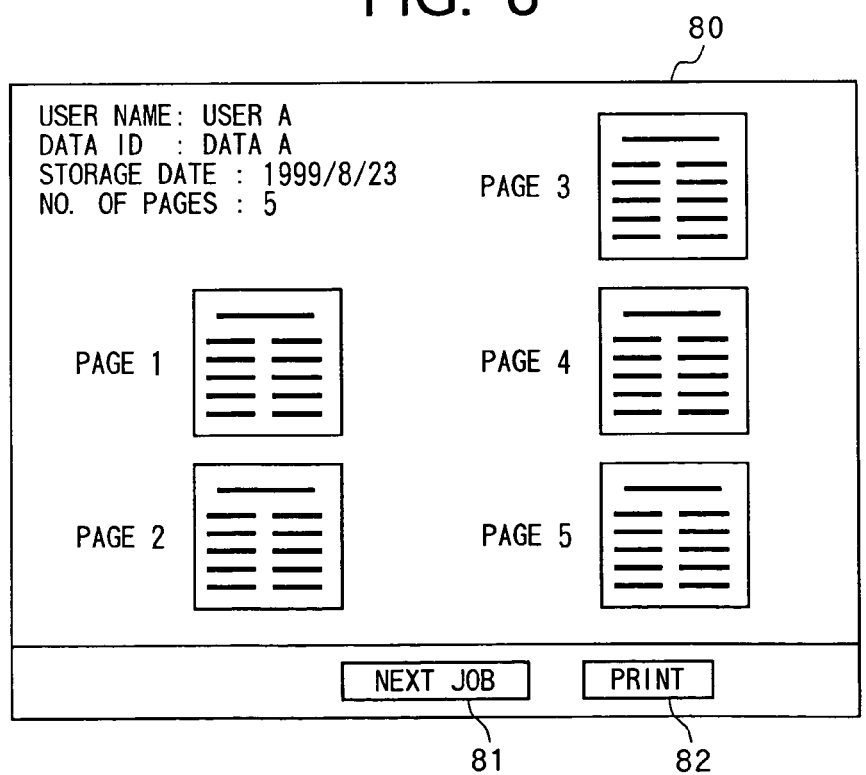
FIG. 6 is a view showing a screen displayed on the display portion of either the printer or the computer.

In the example of FIG. 6, a screen 80 displays all related image and management information of the selected one of the print data sets stored in the hard disk 34.

A print job switching button 81 and a print button 82 are disposed at a lower edge of the screen 80. The print job switching button 81 is for switching the screen to display the related images and management information of the next print data set. For example, when the job switching button 81 is pressed in the situation shown in FIG. 6, then the screen will be switched to display all related images and management information for a data set "DATA B", which is the print data set following a data set "DATA A". The print button 82 is a button for printing out all related images and management information designated for the currently displayed print data set.

In the example of FIG. 6, the screen 80 displays all five related images of the data set "DATA A". However, when a print data set includes more than five pages, then a scroll bar is displayed so that sixth page and more can be displayed by scrolling beyond the fifth page.

It should be noted that the related data screen is not limited to the examples of FIGS. 5 and 6. For example, a plurality of related images and management information for a plurality of print data sets can be selectively displayed at the same time. In this case, a vertical scroll function can be provided for switching display between different print data sets. A horizontal scroll function can also be provided for switching display between different related images of the selected print data set.

With this configuration, when the user wishes to reprint a particular print data set, the user can confirm which print data he or she wishes to reprint while visually examining the related data displayed in S17 or printed out in S19. It should be noted that reprint operations are conventionally well known, so detailed explanation of the reprint operations will be omitted.

Because the related data is prepared at the client device 40, transmitted to the network printer 30, and stored in the hard disk 45 of the network printer 30 as described above, the user can make a proper visual confirmation of the print data in a short duration of time and select desired print data accordingly without having to resend any data to the network printer 30. This makes operation of the system very easy for the user. Also, printing processes can be more efficiently performed.

Because the related images can be designated in any form desired by the user, the user can designate the form that enables the user to most easily grasp the content of the print data. Further, because a representative image is designated for each print data set, the user can even more easily grasp the content of the print data even if the print data includes a plurality of pages.

In the embodiment described above, the related image data is transmitted from the client device 40 to the network printer 30 as header information of print data. However, the related image data can be transmitted in a different manner or at a timing different from the corresponding print data.

Also, in the present embodiment, related data can be both displayed in S17 and printed out in S19. However, the present invention can be applied to a device that only displays or prints out the related data.

Control programs that perform the above described processes of the present embodiment can be stored in any recording medium, such as a floppy disk or CD ROM, and can be installed into and run in the computer 40.

Next, a print system according to a second embodiment of the present invention will be described while referring to FIGS. 7 to 10. In the second embodiment, the present invention is applied to a print system with a computer and a printer connected to a network that uses a transmission control protocol/Internet protocol (TCP/IP) as a protocol.

Figure 7:
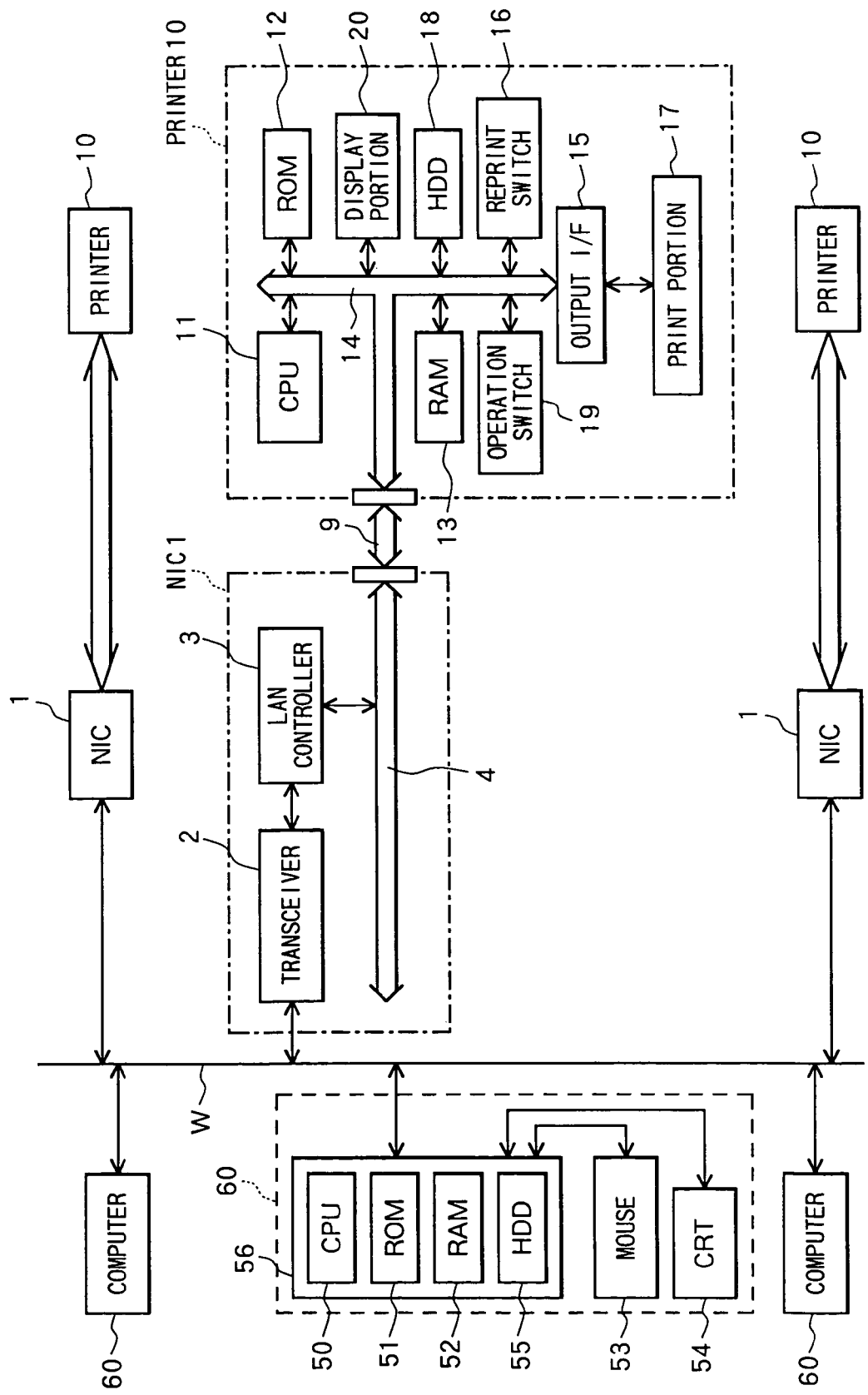
FIG. 7 is a block diagram showing a print system according to a second embodiment of the present invention.

As shown in FIG. 7, the print system according to the present embodiment includes a plurality of computers 60, a network W, such as a telephone circuit or LAN, a plurality of network interface cards (NIC) 1, and a plurality of network printers 10.

Each computer 60 includes a computer body 56, a mouse 53, and a cathode ray tube (CRT) 54. The computer body 56 includes a CPU 50, a ROM 51, a RAM 52, and a hard disk 55. The hard disk 55 of the computer 60 stores word processing software for preparing text and the like for printing, and printer driver software for controlling the printers 10. The printer driver software includes programs for transmitting print data. These programs have been installed into the hard disk 55 from an information memory medium, such as a floppy disk or a compact disk (CD) into a condition in that the programs can run in the computer 60.

Each printer 10 includes a CPU 11, a ROM 12, a RAM 13, a bus 14, an output interface 15, a reprint switch 16, a print portion 17, a hard disk (HDD) 18, an operation switch 19, and a display portion 20. The display portion 20 is formed from an LCD panel, for example. The hard disk 18 can be a PCMCIA card, which is detachably provided to the printer 10. The hard disk 18 stores print data transmitted from the computer 60, in a job unit. Information on how many print data sets are currently stored in the hard disk 18 is stored in the RAM 13, for example. The RAM 13 stores a print control program. The printer 10 interprets information from the computer 60 and also performs print processes to be described below by executing the print control program.

Figure 8:
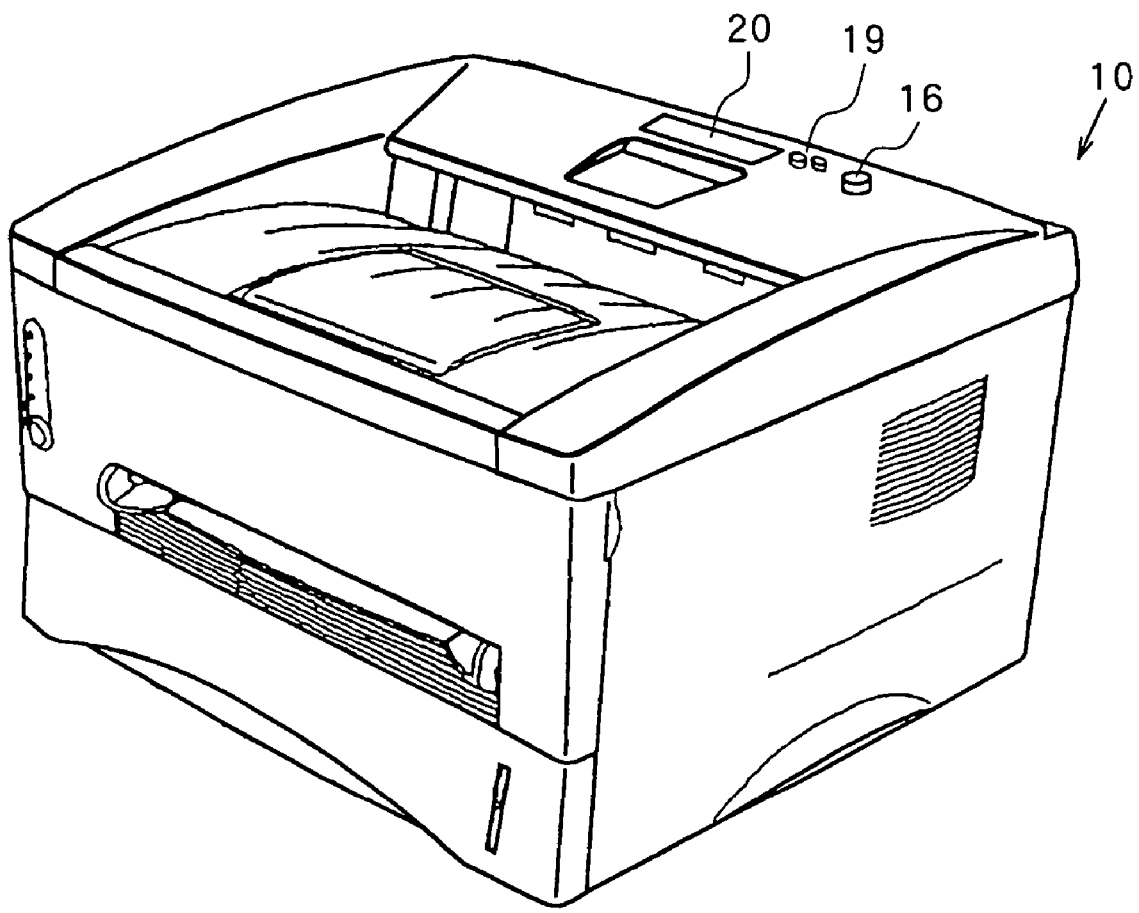
FIG. 8 is a perspective view of a printer of the print system of FIG. 7.

As shown in FIG. 8, the reprint switch 16, the operation switch 19, and the display portion 20 are disposed on an upper panel portion of the printer 10. In this example, the display portion 20 is for displaying 16 characters. The user can select a desired print job or a desired page by operating on the operation switch 16.

Each printer 10 is provided with the NIC 1 and connected to the network W in a hardware hierarchy. The NIC 1 is connected to the printer 10 through a connection line 9, which is connected to the bus 14. The NIC 1 is provided with a transceiver 2, a RAM controller 3, and a bus 4.

Each NIC 1 is allotted a different IP address, which serves as distinction data. The printer 60 transmits a command with a particular IP address so that the command is transmitted to a desired one of the printers 10 connected to the NIC 1.

Next, a reprint process executed in the printer 10 according to the present embodiment will be described while referring to the flowcharts in FIGS. 9 and 10.

The reprint process is usually executed after performing normal print operations. In this example, it is assumed that print data has been transmitted from the computer 60 to the printer 10 and that the print operations have been completely performed based on the transmitted print data. Accordingly, the print data has been stored in the hard disk 18 of the printer 10. Also, it is assumed that management data relating to the print data has been stored in the RAM 13 of the printer 10.

Figure 9:
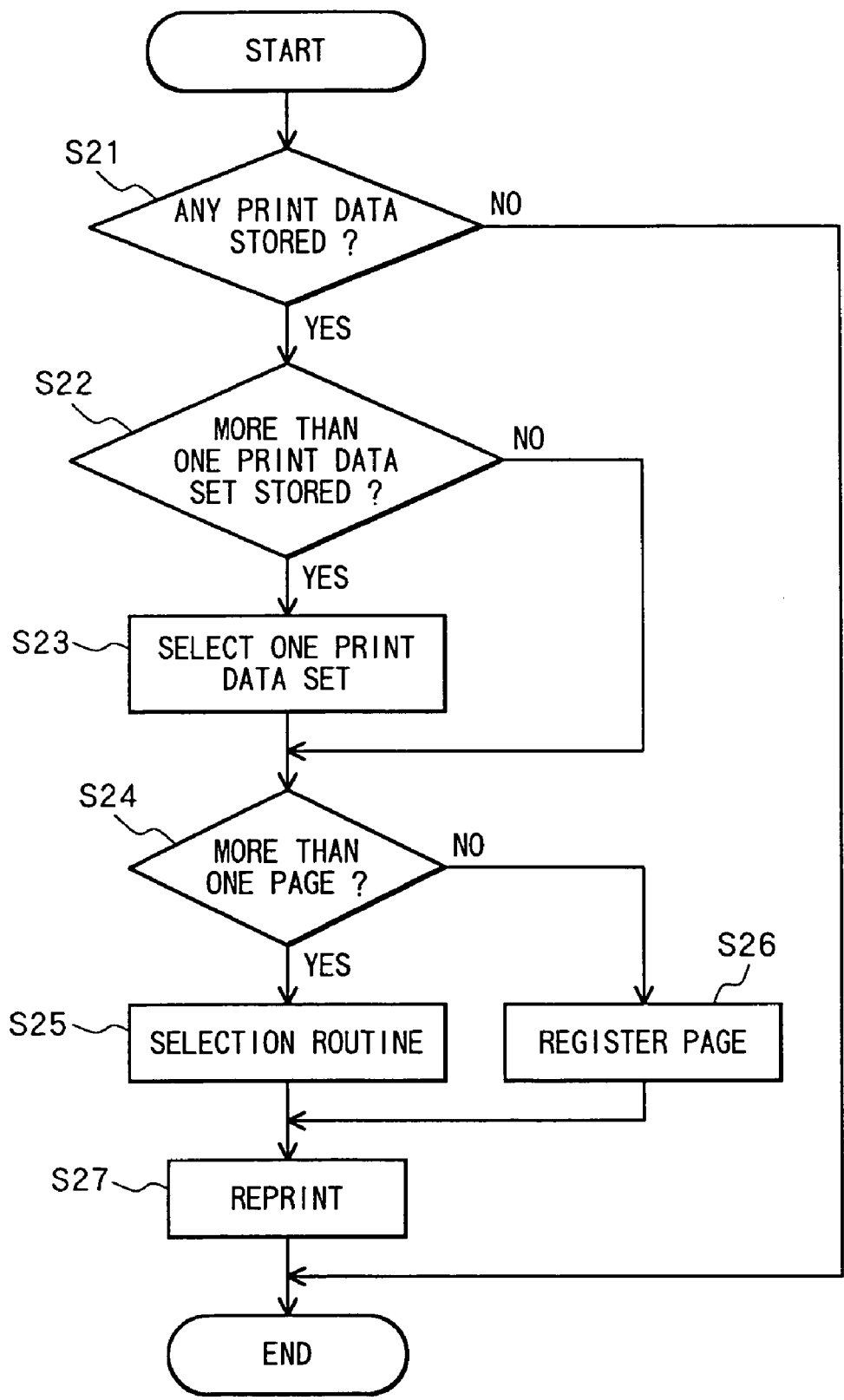
FIG. 9 is a flowchart representing reprint processes executed in the printer.
Figure 10:
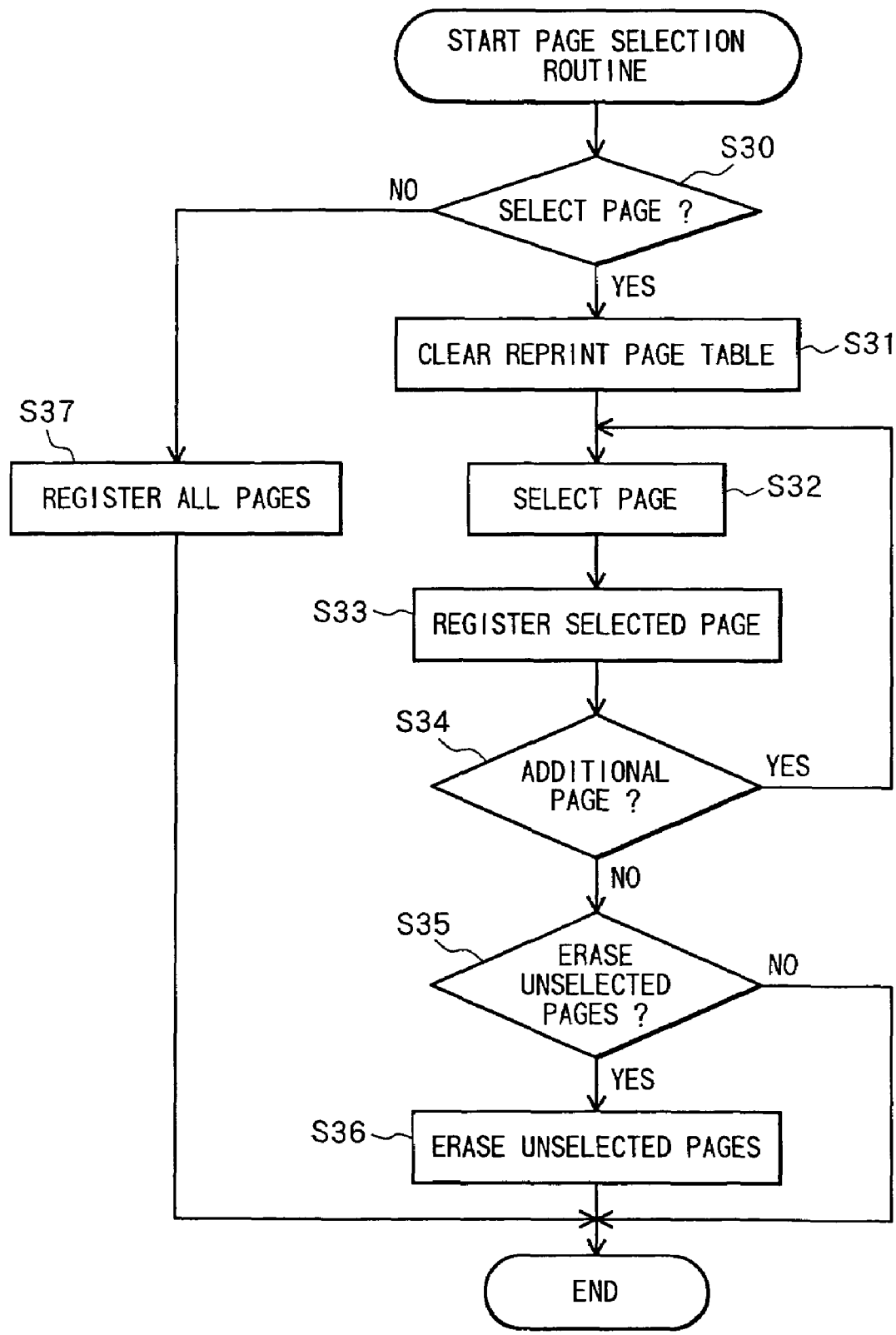
FIG. 10 is a flowchart representing page selection processes executed in a select page process of the flowchart of FIG. 9.

The reprint process of FIG. 9 is started when the user presses down the reprint key 16 of the printer 10. Once the process is started, first in S21, the CPU 11 judges whether or not any print data is stored in the hard disk 18. If not (S21: NO), then this routine is ended. On the other hand, if so (S21:YES), then in S22, the CPU 11 judges whether or not a plurality of print data sets are presently stored in the hard disk 18 by referring to the RAM 13 for example. If only a single print data set is being stored (S22:NO), then the routine proceeds to S24. On the other hand, if a plurality of print data sets are stored (S22:YES), then in S23, print job selection is performed. Specifically, the display portion 20 displays ID numbers of all print jobs stored in the hard disk 18 and a message for urging the user to select the ID number of the desired print job. Referring to this message, the user operates the operation switch 19 to select the ID number of the desired print job that the user wishes to reprint. It should be noted that an ID number is automatically designated to each print job by the printer 10 in the order in which the print data sets are stored in the hard disk 18. Because the display portion 20 is small and capable of displaying only 16 characters as described above, a scroll can also be displayed in order for displaying ID numbers which cannot be displayed at once.

Alternatively, the ID number of the desired print job can be directly inputted by the user using the operation switch 19.

Then, the present routine proceeds to S24. In S24, it is judged whether or not the selected single print job includes a plurality of pages by referring to the management information stored in the RAM 13. If only a single page is included in the selected print job (S24:NO), then in S26, the CPU 11 retrieves the print data of the selected print job from the hard disk 18 and updates the content of a reprint page table so as to register the print data in the reprint page table. The reprint page table is a region in the RAM 13 for storing data which is the subject of reprint operations. It should be noted that if the exact same print data is already stored in the reprint page table, then the CPU 11 does not update the content of the reprint page region. Then, the routine proceeds to S27. If the selected print job includes a plurality of pages (S24:YES), then page selection processes are executed in S25, and the present routine proceeds to S27.

The page selection processes executed in S25 will be described while referring to the flowchart of FIG. 10. First, in S30, the CPU 11 controls the display portion 20 to display a message urging the user to indicate whether he or she wishes to select a particular page of the selected job. If the user indicates through the operation switch 19 that he or she does not wish to select a particular page (S30:NO), then in S37, the CPU 11 retrieves print data for all pages of the selected print job from the hard disk 18, and updates the content of the reprint page table so as to register the print data into the reprint page table. At this time also, if the exact same print data is currently stored in the reprint page table, then it is unnecessary to update the content of the reprint page table. Then, the routine is ended.

On the other hand, if the user indicates he or she wishes to select a particular page of the selected print job (S30:YES), then in S31, the CPU 11 clears the reprint page table. Next, in S32, the user selects a desired page of the print job and inputs the page number of the desired page. Because the reprint process is usually performed after a normal printout operation, the user will normally have all printed pages, so the user can select the desired page while freely referring to these printed pages.

Then in S33, the CPU 11 retrieves print data for the selected page from the hard disk 18, and stores the print data into the reprint page table. Next, in S34, the CPU 11 controls the display portion 20 to display a message asking the user whether or not he or she wishes to select an additional page. If the user indicates that he or she wishes to select an additional page (S34:YES), then the processes of S32 to S34 are repeated. In this way, the user can select as many pages as he or she desires, rather than only a single page. It should be noted that the reprint operations in S27 are executed in the order in which pages are registered in the reprint page table in S33.

If the user does not wish to select an additional page (S34: NO), then in S35, a message is displayed on the display portion 20 asking the user whether or not he or she wishes to erase print data of the unselected pages, which were not selected by the user in S32, of the print job from the hard disk 18. If not (S35:NO), then the routine is ended. If so (S35: YES), then in S36, print data for unselected pages is erased from the hard disk 18. The processes in S34, S35 are provided because it can be assumed that the user will never need to reprint the unselected pages in the future. By erasing print data for unnecessary pages, the memory region of the hard disk 18 can be more effectively used. Also, when the user wishes again to select the same selected pages later on, the user will not have to again indicate the desired pages for the print data, so the user's operations can be even more efficient.

Once the page selection is completed in S25, then in S27 of the flowchart in FIG. 9, the CPU 11 retrieves the print data registered in the reprint page table and outputs the print data to the print portion 17. The print portion 17 then reprints out the print data, and the present routine is ended.

With the above-described configuration, the user can have the printer reprint only those pages that he or she desires to be printed in the order he or she desires. Therefore, the print processes can be more efficiently performed.

It should be noted that the printer 10 can be configured so that data stored in the reprint data table is automatically erased each time a fixed duration of time has elapsed or at a time indicated by a user.

Although the present embodiment described printers and computers connected to a network, the printers and computers can be connected directly to each other by a cable, for example.

Also, the related data control means of the first embodiment can be used in the configuration of the second embodiment. That is to say, related data including management data and related image data can be prepared at the computer 60 and then stored in correspondence with the print data in the hard disk 18 of the printer 10. By displaying or outputting the related data in accordance with the needs of the user, then the job selection of S23 and page selection of S25 can be more easily performed. Because the related data that has already been stored can be effectively used, the user can visually confirm the print data in a short period of time in order to facilitate a selection of the print data. Therefore, the print processes are more efficient. In this case, it is desirable that the printer be provided with the display portion large enough to display the screen 70, 80 shown in FIG. 5, 6.

Next, a third embodiment of the present invention will be described while referring to FIGS. 11 to 15. It should be noted that components that are common to both the second and third embodiments will be assigned with the same numbering and their explanation will be omitted.

The present embodiment describes the present invention applied to a print system with a host computer and a printer connected by a network wherein the network is managed by World Wide Web (WWW) protocol. The WWW protocol is used in an information network that access to a variety of information by building a program called hyper text on the network.

Here, brief outline for the WWW protocol will be described. WWW is an information system for managing a network managing information of a variety of terminal devices, such as printers, in a unified manner at another computer. The computer is installed with a program called a WWW browser, which enables the computer to serially browse setting conditions for each terminal device one at a time. The computer the such information to control the network.

In each of these terminal devices, images, and character information are expressed using hypertext. Hypertext program uses a language called hypertext markup language (HTML). A hyper text transfer protocol (HTTP) is used as a protocol for communicating between the computers and terminal devices.

Figure 11:
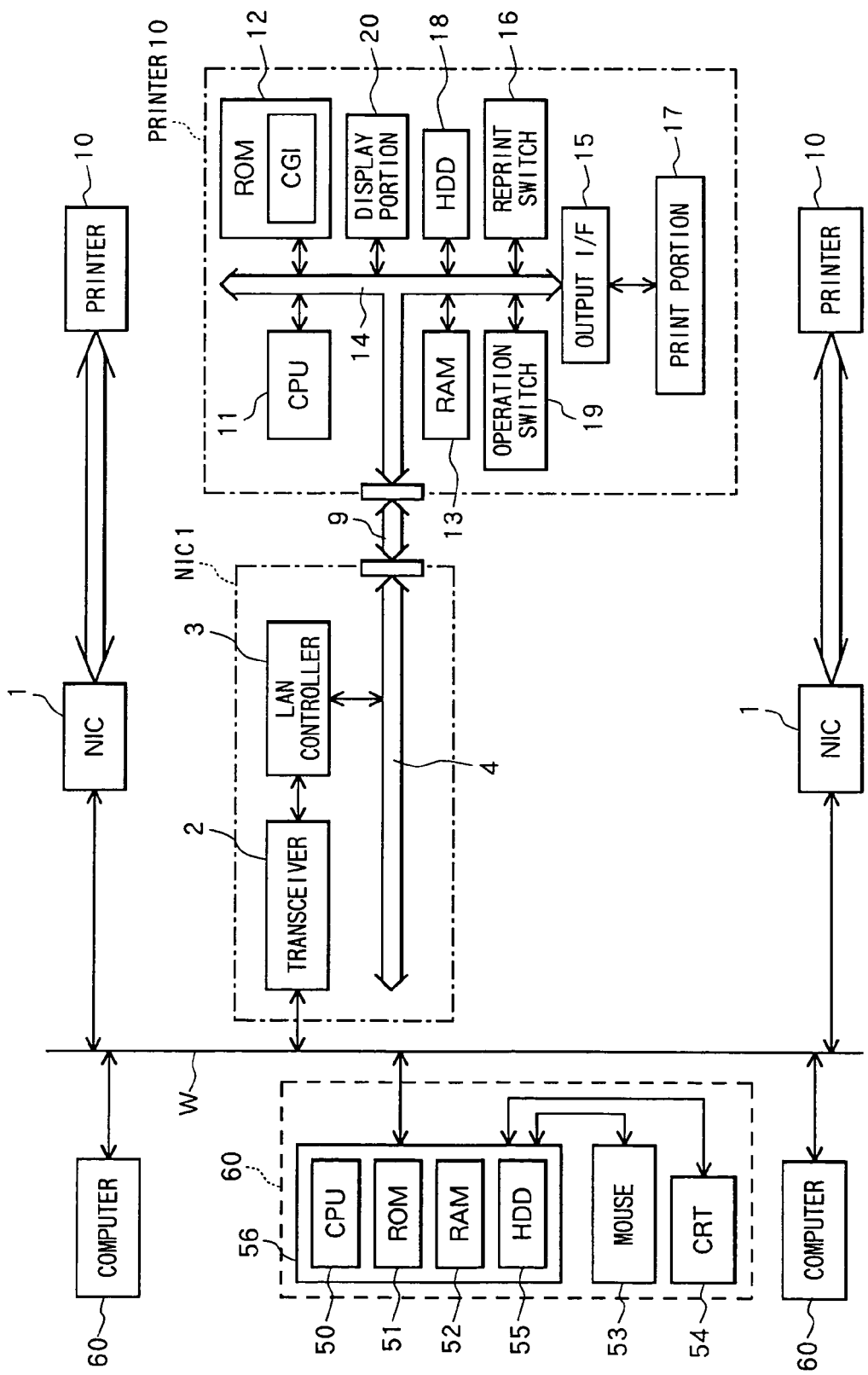
FIG. 11 is a block diagram showing a print system according to a third embodiment of the present invention.

In the present embodiment, a common gateway interface (CGI) 12a is installed as a program in the ROM 12 of the printer 10 as shown in FIG. 11. The CGI 12a configures HTML that corresponds to a command from the computer 60 and interprets information called form which is generally transmitted from the computer 60. For example, when the user of the computer 60 sets the number of sheets to be printed to 5, the computer 60 will transmit the form "COPIES=5" to the CGI 12a of the printer 10.

Each computer 60 and printer 10 is assigned with distinction information called a uniform resource locator (URL). The computer 10 can specify a particular printer 60 by referring to the designated URL of the printer 60. According to the present embodiment, each printer 60 is allotted with a different IP address, and it is assumed that the user knows the IP address of each printer 60. The user uses the IP addresses to designate the URL.

Next, processes of the present embodiment will be described while referring to FIGS. 12 to 15. It should be noted that a control program for performing processes to be described below is stored both in the hard disk 55 of the computer 60 and in the ROM 12 of the printer 10. The control program can be installed in executable condition into the hard disk 55 of the computer 60 from a CD ROM, a floppy disk, or some other information storing medium.

It is assumed that print data and related data have been prepared in the computer 60, transmitted to the printer 10, and stored in the hard disk 18 of the printer 10 in the same manner as in the first embodiment.

Figure 12:
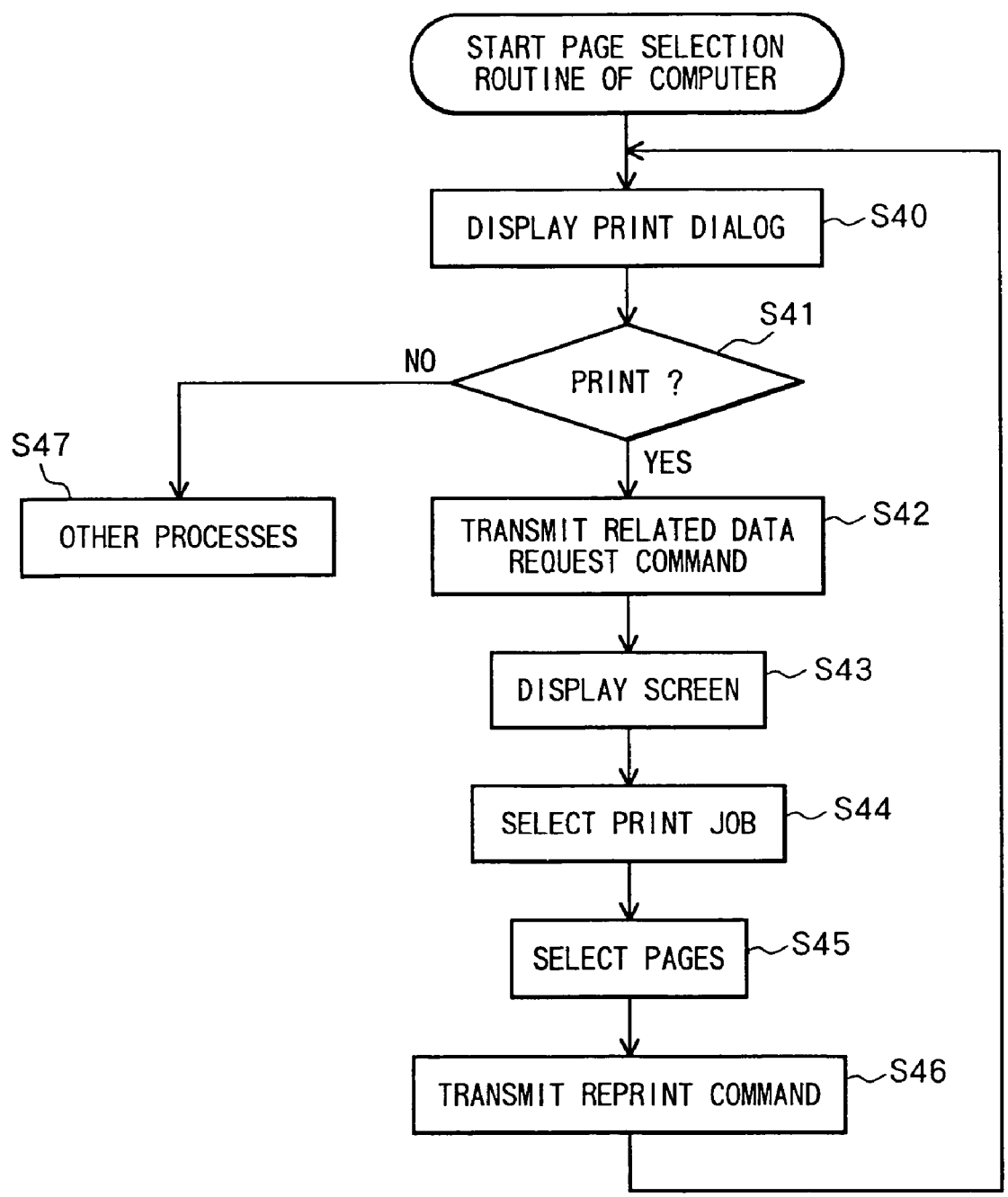
FIG. 12 is a flowchart representing page selection processes executed in a computer of the print system of FIG. 11.

First, a page selection routine performed in the computer 60 will be described while referring to the flowchart of FIG. 12. The routine is started when an application, such as a word processing software, is executed, and a print menu of the application is selected by the user. Once the routine is started, first in S40, a print dialog is displayed on the CRT 54. The print dialog includes buttons for various operations relating to printing, such as for printer selection and print operations for example, and the user can select a desired operation by pressing the corresponding button.

When the user presses any one of the buttons on the print dialog, then in S41, it is judged whether or not the user has pressed a button for a reprint operation. If not (S41:NO), then the routine proceeds to S47 and selected operation other than reprint operation is executed. On the other hand, if so (S41: YES), then in S42, the CPU 50 transmits a related data request command to the printer 10 for requesting the printer 10 to transmit all data spooled in the hard disk 18 of the printer 10.

Figure 14:
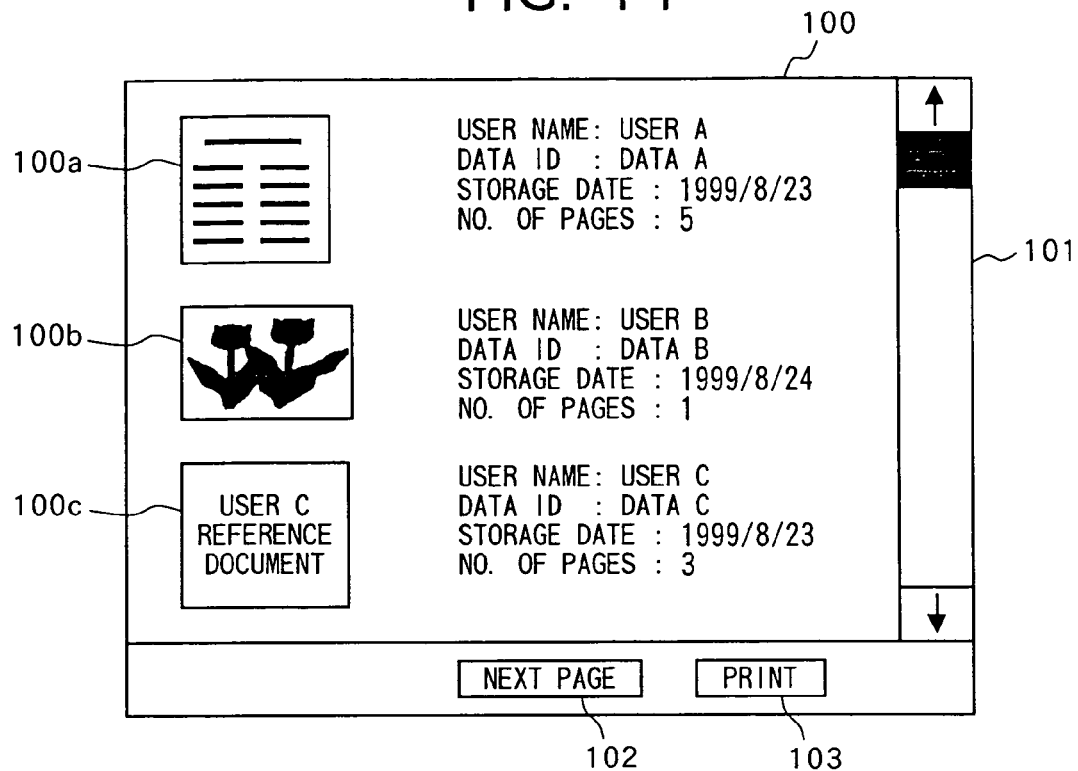
FIG. 14 is a view showing a screen displayed on a display portion of the computer of FIG. 11.

In S43, the CPU 50 of the computer 60 receives the related data from the printer 10 and displays a reprint process display screen 100 shown in FIG. 14 on the CRT 54 based on the received related data. The display screen 100 displays representative images of each print job as thumbnails 110a, 110b, 110c, and also displays corresponding management information next to the thumbnails 110a to 110c. If the display screen 100 cannot display all representative images and management information at one time, then the user can view all the representative images and management information by dragging a scroll bar 101 or clicking a next page button 102.

Figure 15:
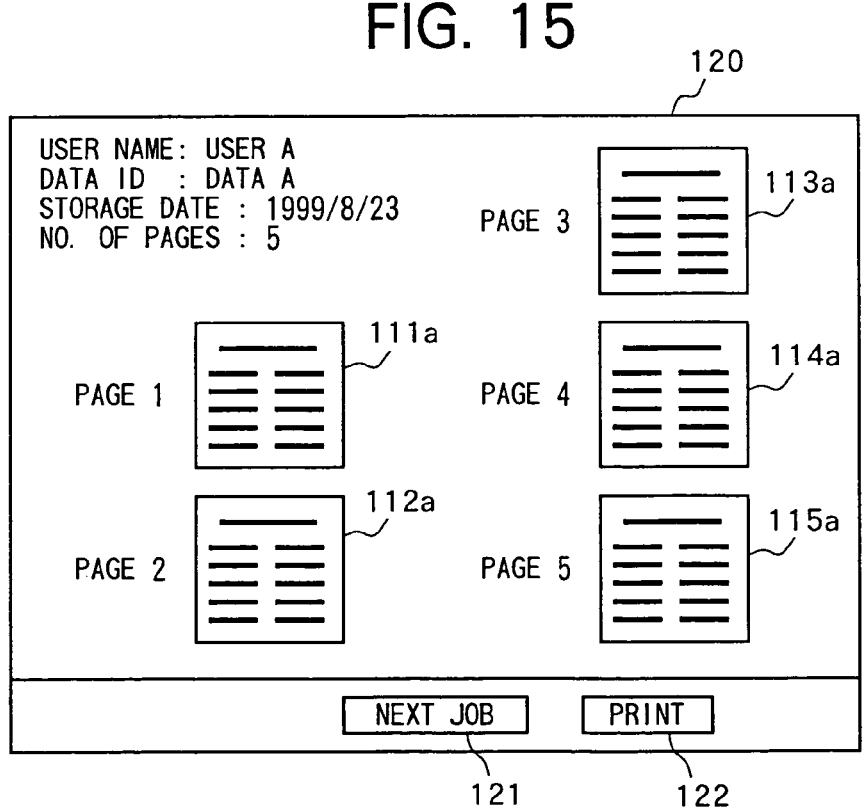
FIG. 15 is a view showing a screen displayed on the display portion of the computer of FIG. 11.

In S44, the user selects one of thumbnails 110a to 110c of a desired print job, and then the user clicks on the print button 103. In this example, it is assumed that the thumbnail 110a of a data set "DATA A" is selected and then the print button 103 is clicked. Then in S45, as shown in FIG. 15, a page display screen 120 displays all related images of the data set "DATA A" as thumbnails 111a to 115a along with the management information of the data set "DATA A". Referring to the display screen 120, the user selects pages that he or she wishes to reprint by clicking on corresponding thumbnails one at a time. It should be noted that the selected pages will be reprinted later on in the order in which the user selects them in S45. If the page display screen 120 cannot display all of the related images at one time, then a scroll bar can be provided in the same manner as in the display screen 100 of FIG. 14.

If the user clicks on the next job button 121, then, all related images of the next job, that is, the data set "DATA B" in this example, will be displayed on the page display screen 120.

After the user selected desired pages in the manner described above, the user clicks on the print button 122. Then, the routine proceeds to S46, wherein the CPU 50 transmits a reprint command to the printer 10. At the same time, data ID and selected page numbers of the selected job are also transmitted to the printer 10, and the present routine returns to S40.

Figure 13:
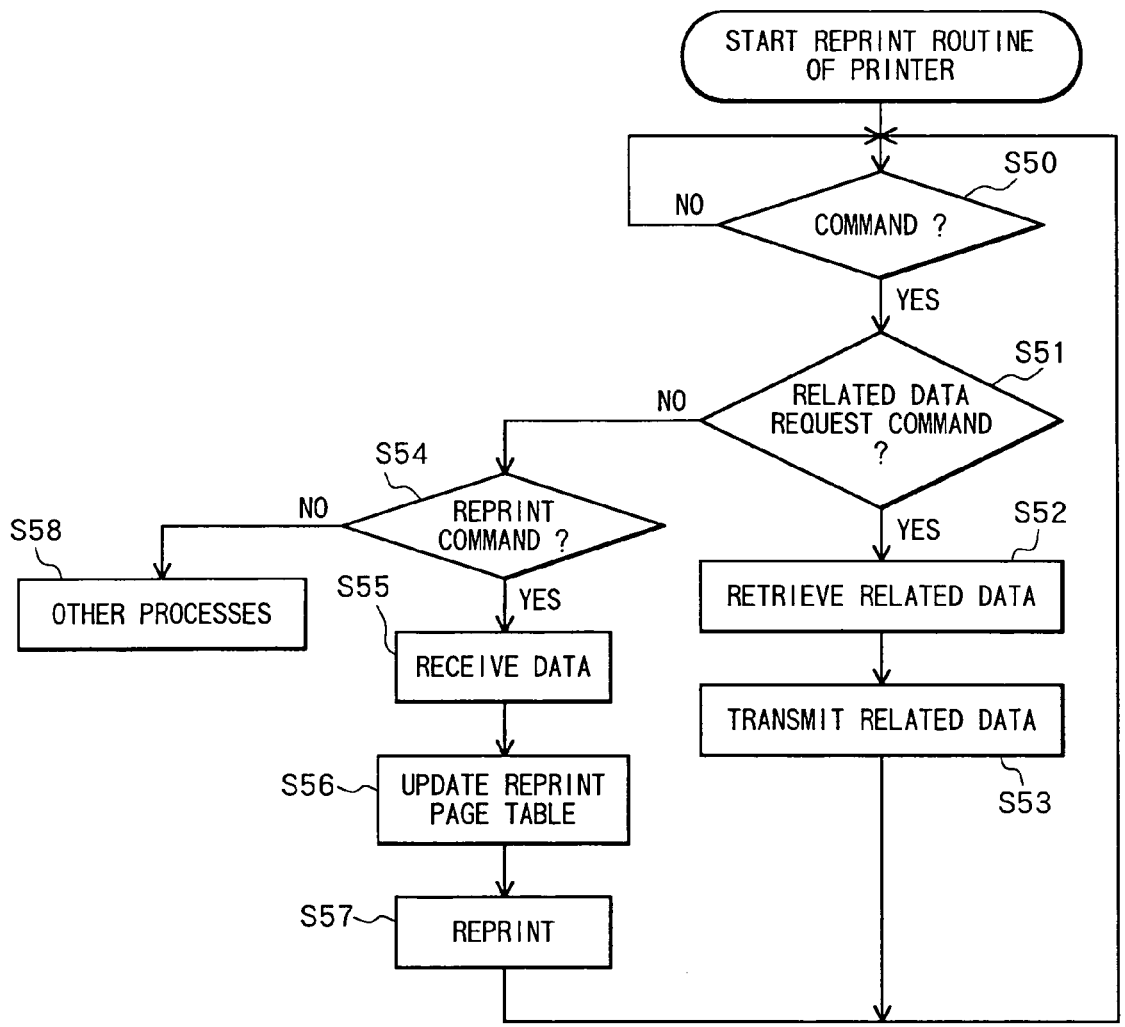
FIG. 13 is a flowchart representing reprint processes executed in a printer of the print system of FIG. 11.

Next, the reprint routine executed in the printer 10 will be described while referring to the flowchart of FIG. 13. First, the CPU 11 determines whether or not any command is received from the computer 60. If not (S50:NO), the CPU 11 waits until a command is received. If so (S50:YES), then in S51, the CPU 11 judges whether or not the command is a related data request command. If so (S51:YES), then in S52, the CPU 11 retrieves all related data from the hard disk 18. Then in S53, the CPU 11 transmits the related data to the computer 60. Then, the routine returns to S50.

If the received command is not a related data request command (S51:NO), then in S54, the CPU 11 judges whether or not the command is a reprint command. If so (S54:YES), then in S55, CPU 11 receives data ID and selected page numbers of the selected job from the computer 60. Next in S56, the CPU 11 updates the reprint page table of the hard disk 18 based on the data received in S55 in the same manner as in the second embodiment. Next in S57, the CPU 11 performs the reprint process while referring to the content of the reprint page table. Then, the routine returns to S50.

If the received command is not a reprint command (S54: NO), the routine proceeds to S58, wherein other processes corresponding to the received command are performed.

As described above, according to the present embodiment, the user can select pages he or she wishes to have the printer 10 reprint by operating on the computer 60. Also, because the user can select desired pages by referring to the thumbnail of each page of a desired print job, the user can further easily select pages.

Further, because only desired pages are reprinted in desired order, print operations are even more efficient.

It should be noted that the judgement on whether or not unselected pages should be erased from the hard disk 18 can be performed before the reprint process of S57 in the same manner as in the second embodiment.

The second and third embodiments describe the RAM and the hard disk as an examples of a memory. However, the present invention can be applied to other memory media such as an electrically rewritable ROM or a non-volatile RAM.

While the invention has been described in detail and with reference to specific embodiments thereof, it would be apparent to those skilled in the art that various changes and modifications may be made therein without departing from the spirit and scope of the invention.

What is claimed is:

1. A method of controlling a print device, comprising:
    printing out a plurality of pages based on print data by the print device;
    holding the print data in a memory of the print device after printing the plurality of pages has been completed;
    enabling selection, by a user, of at least one of the plurality of pages based on the held print data, the at least one of the plurality of pages being selected from any of the plurality of pages;
    re-printing the at least one of the plurality of pages selected by the user;
    holding related image data along with the print data, the related image data being in correspondence with the print data; and
    displaying indicia representative of page information of the print data based on the related image data.

2. The method according to claim 1, further comprising setting an order in which the at least one of the plurality of pages is printed out.

3. The method according to claim 1, further comprising erasing the print data for pages which have been unselected by the user.

4. A method of controlling a print device, comprising:
    printing out a plurality of pages based on print data by the print device;
    holding the print data after printing the plurality of pages has been completed;

enabling selection, by a user, of at least one of the plurality of pages based on the held print data, the at least one of the plurality of pages being selected from any of the plurality of pages; and re-printing the at least one of the plurality of pages selected by the user, wherein the print data holding step further holds related image data along with the print data, the related image data being in correspondence with the print data.

5. The method according to claim 1, wherein the indicia represents images corresponding to the plurality of pages.

6. The method according to claim 5, wherein the images corresponding to the plurality of pages are reduced-size page images of the plurality of pages.

7. The method according to claim 1, wherein the selecting step comprises inputting an instruction to the print device by the user to designate the at least one of the plurality of pages.

8. The method according to claim 1, wherein the enabling includes inputting by the user at least one page number of the at least one of the plurality of pages.

9. The method according to claim 1, wherein the holding step holds the print data by the print device.

10. The method according to claim 4, further comprising setting an order in which the at least one of the plurality of pages is printed out.

11. The method according to claim 4, further comprising erasing the print data for pages which have been unselected by the user.

12. The method according to claim 4, further comprising displaying indicia representative of page information of the print data based on the related image data.

13. The method according to claim 12, wherein the indicia represents images corresponding to the plurality of pages.

14. The method according to claim 13, wherein the images corresponding to the plurality of pages are reduced-size page images of the plurality of pages.

15. The method according to claim 4, wherein the print data holding step is performed with respect to a memory provided in the print device.

16. The method according to claim 4, wherein the selecting step comprises inputting an instruction to the print device by the user to designate the at least one of the plurality of pages.

17. The method according to claim 4, wherein the enabling includes inputting by the user at least one page number of the at least one of the plurality of pages.

18. The method according to claim 4, wherein the holding step holds the print data by the print device.

* * * * *

UNITED STATES PATENT AND TRADEMARK OFFICE
CERTIFICATE OF CORRECTION

PATENT NO.         : 7,573,590 B2
APPLICATION NO. : 11/267281
DATED                 : August 11, 2009
INVENTOR(S)       : Naoki Hashimoto et al.

It is certified that error appears in the above-identified patent and that said Letters Patent is hereby corrected as shown below:

Title page,

Item [75], Inventors: "Naoki Hashimoto, Nagoya (JP); Toru Tsuzuki, Nagoya (JP)," should read --Naoki Hashimoto, Nagoya (JP); Toru Tsuzuki, Okazaki (JP).--

Signed and Sealed this

Thirteenth Day of October, 2009

David J. Kappos
*Director of the United States Patent and Trademark Office*